July 19, 1949.    E. G. BEARD    2,476,349
PHASE OR FREQUENCY MODULATION SYSTEM
Filed Nov. 7, 1945
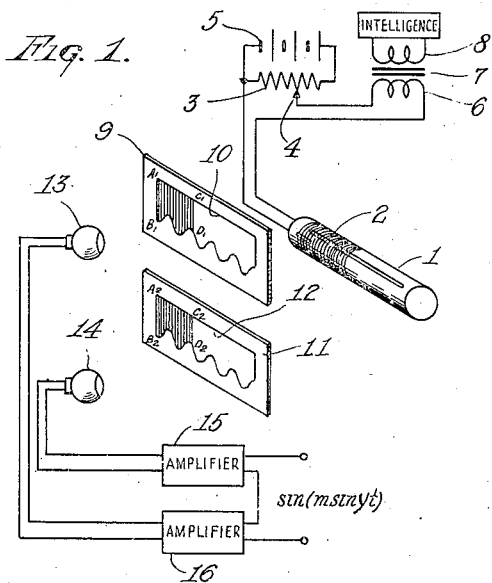
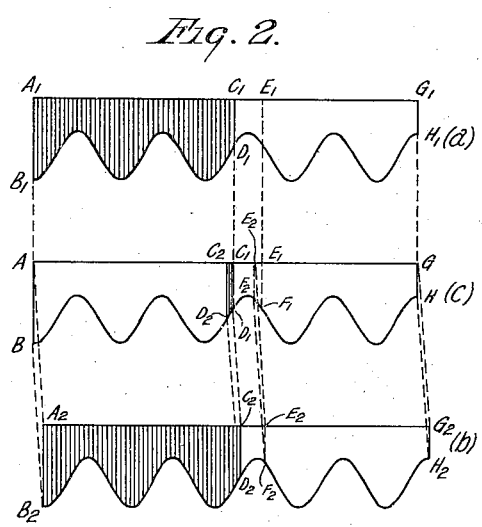
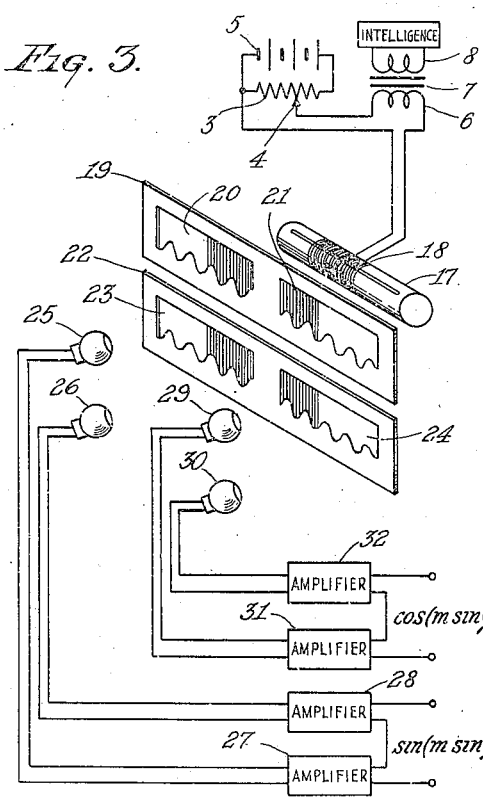
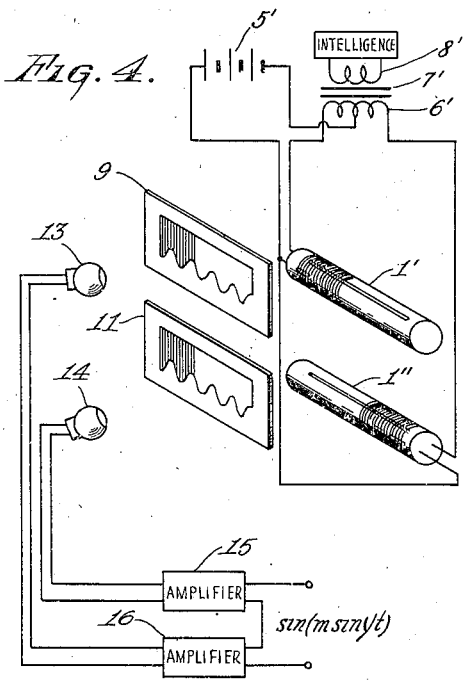
ERNEST G. BEARD.
INVENTOR.
BY
ATTORNEY.

Patented July 19, 1949

2,476,349

UNITED STATES PATENT OFFICE 2,476,349

PHASE OR FREQUENCY MODULATION SYSTEM

Ernest G. Beard, Sydney, New South Wales, Australia, assignor to Hartford National Bank & Trust Company, Hartford, Conn., as trustee Application November 7, 1945, Serial No. 627,265
In Australia September 4, 1944

Section 1, Public Law 690, August 8, 1946
Patent expires September 4, 1964

6 Claims. (Cl. 332—3)

This invention relates to phase or frequency modulation systems and it is the primary object of the invention to provide improved means whereby a carrier wave having a stabilized frequency may be phase or frequency modulated by means of intelligence.

It is known that the expression for a frequency modulated wave is of the form $$\sin (\omega t + m \sin \gamma t)$$

which is equivalent to $$\sin \omega t \cos (m \sin \gamma t) + \cos \omega t \sin (m \sin \gamma t)$$

In an article entitled "New system of frequency modulation" by Sabaroff and published in "Communications" for September 1941 and also in the specification of United States Patent No. 2,294,209 to Roder it is demonstrated that the major difficulty met with in frequency modulating a carrier wave is the production of the terms $$\cos (m \sin \gamma t)$$

and $$\sin (m \sin \gamma t)$$

In the article in "Communications" a means of producing the electrical equivalent of the above expression, in which use is made of a vibrating mirror and mask, is described. The specification of United States Patent 2,294,209 describes a somewhat similar system, in which a cathode ray oscilloscope is utilized to perform the functions of the vibrating mirror.

According to one embodiment of the present invention the use of either a vibrating mirror or a cathode ray oscillograph is avoided by employing a neon tube or the like gas filled tube which produces a columnar source of light whose length is dependent upon the potential applied to the tube.

When a tube of the above nature is embodied in apparatus in accordance with the invention a direct current potential is applied to the tube and a potential of the modulation intelligence is superimposed on the direct current potential. It therefore follows that the light emitted by the tube at any instant will be proportional to the sum of the direct current potential and the potential of the modulating intelligence. The light emitted by one half of such a tube may be used or, if desired, the light emitted by both halves may be utilized.

According to a further embodiment of the invention a column of light whose length is proportional to a modulating signal or intelligence is produced from a film such as that employed in sound on film recording for talking picture apparatus where the variable area method of recording is employed, i. e. in recording by the well known Philips-Miller process as described in the specification of United States Patent No. 1,919,116 issued July 18, 1933 where an image of the sound track is projected onto a slit which is at right angles to the direction of movement of the film.

The invention also provides means whereby a column of light whose length varies in accordance with the modulating signal or intelligence is converted into cosine, and/or sine functions of the intelligence. As mentioned in the specification of copending United States Patent application Ser. No. 622,063, filed October 12, 1945, such sine and cosine functions can be used to modulate the amplitude of carrier waves displaced in quadrature so that the sum of the waves is a carrier wave, the frequency of which is modulated by the modulating signal.

The conversion process may be accomplished by forming an image of the column of light on a mask or the like, the shape of which is substantially that of a sine wave or cosine wave so that the light passing through, or reflected from, the mask will contain, amongst other terms, a sine or cosine function of the modulating signal or intelligence.

The invention will now be described with the aid of the accompanying drawing forming a part of the specification and in which:

Figure 1 is a schematic representation of a device according to the invention;

Fig. 2 is a schematic diagram illustrating the underlying principle of the invention;

Fig. 3 is a schematic diagram of an embodiment of the invention; and

Fig. 4 is a schematic diagram of another embodiment of the invention.

Referring to Fig. 1, there is shown a basic form of device according to the invention comprising a columnar light source 1 emitting light flux from a portion 2 connected by means of a potential divider 3 having a tapping 4 to a source of direct current operating potential which is represented in this instance by a battery 5. Interposed in the circuit, between the light source 1 and the potential divider 3, is a secondary winding 6 of a transformer 7 by means of primary winding 8 of which an alternating current voltage proportional to the modulating signal or intelligence is superimposed on the direct current component present in the secondary circuit. Located in front of tube 1 is a masking element 9 having an aperture 10.

It is assumed that in the absence of a modulating signal, the extent of illumination of the aperture 10 by tube 1 is the area bounded by the geometrical figure $\overline{ABCD}$. In this case, the line $\overline{CD}$, which is a projection of the varying end of the light column, represents zero modulation level.

When a modulating signal or intelligence is applied to the column of light, the line $\overline{CD}$, will move to and fro along the mask in accordance with the varying length of the column of light, on the mask 9, the area through which the light passes increasing and decreasing in synchronism with this movement, but also increasing and decreasing in sinusoidal manner because of the shape of the mask. Hence the wave form of the light passing through the mask will contain a sine function of the movement with the addition of other frequencies such as the frequency of the modulating signal itself and a component representing the light emitted by the column of light without the presence of the modulating signal or intelligence.

The sine function may be abstracted from this wave form by means of a second mask 11 of exactly similar type to the mask 9. For purposes of illustration, masks 9 and 11 are shown one below the other and in the same plane, however, it is obvious that they may be placed in a variety of ways to achieve the same effect. The mask 11 is also illuminated by an image of the column of light but the line $\overline{C_2D_2}$ i. e. the edge of the light image, when no modulating signal is applied to the column of light, on this mask, is slightly displaced from the equivalent position of the line $\overline{C_1D_1}$ of the mask 9. To aid in understanding the operation of the device, a schematic diagram illustrating the underlying principle of the invention is shown in Fig. 2. At Fig. 2(a) and 2(b), there are shown diagrams of the respective apertures 10 and 12 only, the shaded portions $\overline{A_1B_1C_1D_1}$ and $\overline{A_2B_2C_2D_2}$ respectively representing the areas illuminated by the light source. At Fig. 2(c), there is shown a diagram of the two apertures superimposed, the shaded portion $\overline{C_2C_1D_2D_1}$ representing the difference of illuminated area brought about by the displacement of one mask with respect to the other. The before-mentioned displacement can be effected by either displacing the mask 11, or if separate tubes are used for each mask by displacing the column of light of one of the tubes with respect to the other, or, where the source of the light is a neon tube or the like, by slightly changing the bias voltage applied to one of the tubes, for example, by means of the adjustable tap 4 on potential divider 3, as shown in Fig. 1.

The light passing through the mask 11 will be equal to that passing through the mask 9 plus or minus the bar of light brought about by the displacement of one mask with respect to the other. For a given degree of modulation the illuminated area of the respective apertures will be $\overline{A_1E_1B_1F_1}$ and $\overline{A_2E_2B_2F_2}$, the resultant bar of light, proportional to the difference in illuminated areas, being shown in the superimposed diagram as $\overline{E_2E_1F_2F_1}$, hence it is evident that according to the invention the equivalent of a bar of light is made to move laterally along the mask and in so doing the light emanating therefrom will contain a sine function of the movement.

If a photoelectric cell and ancillary equipment is associated with each mask and the light passing through each of the masks is applied to the respective photoelectric cell, as shown in Fig. 1, if the electrical energy produced by the conversion of the light to electrical energy is identical in each instance, and if the output of each of the cells and ancillary equipment are connected in opposition the outputs of the photoelectric cells will neutralize each other with the exception of the portion resulting from the displacement of the masks. This portion is equivalent to the sweeping of a single mask with a bar of light whose width is equal to the displacement between the masks 9 and 11 and is sine function or cosine function of the modulating signal or intelligence according to the reference length of light column and the projected initial position of the line $\overline{CD}$.

If the column of light is produced by a source such as a neon tube or the like gasfilled tube there is a possibility that the end edge of the light will be curved. If the same column of light is used for both masks the effects of such curvature will cancel out. If desired, however, the mask may be distorted to compensate for such curvature.

If the tube used is of the type in which the illuminated area spreads out in two directions from the center, the light from one half of the tube may be used with one pair of masks to produce a sine function, while the light from the other half may be used with another pair of masks to produce a cosine function. Such a device is shown in Fig. 3 wherein a tube 17 of such construction that the center portion 18 is illuminated in both directions from center upon being excited by the potentials produced by the arrangement of components 3, 5, and 7 which are identical to those employed in the arrangement illustrated in Fig. 1. Masks 19 and 22 having cooperating apertures 20 and 23 and 21 and 24 identical to apertures 10 and 12 of masks 9 and 11 except that the waveform of the apertures 21 and 24 are advanced by 90° to produce the cosine function. In each instance, of course, cooperating apertures are slightly displaced laterally as previously described. Alternatively, the whole tube may be used to provide a single function using a mask, for example 19, having apertures 20 and 21 of the same form and, as previously described, displaced with respect to the opposite edges of the light column in the absence of modulation.

Optical systems such as are required for the formation of duplicate images of the sources of light are not described herein as they are well known.

In an alternative form of the invention, illustrated in Fig. 4, two masks 9 and 11 displaced in the manner above described are employed in conjunction with two columns of light of equal intensity produced by tubes 1' and 1''. If the columns of light are modulated in opposite phase by the modulating signals or intelligence, as for example, by means of a transformer 7' as shown in Fig. 4, the sum of the light through the masks will be a constant quantity plus an amount which is the equivalent of the bar of light resulting from the displacement of the masks, modulated by the sine function or the cosine function of the modulating signal or intelligence.

When the source of light is the illuminated area of a film as mentioned in the foregoing, certain advantages are obtained. For instance dust, dirt, scratches and the like on the surface of the film can only take any substantial effect if they occur on the outline of the recording. Dust inside the transparent area of the film cannot cause undue noise. So far as dirt or dust on the outline of the recording is concerned, the effect is to alter the shape of the end of the light column and, as has already been pointed out, this equally affects the light on each of the masks and therefore does not materially affect the width of the effective bar of light. Hence it does not materially affect the produced sine and cosine functions.

Variations in the density of the film will affect the amplitude of both the sine and cosine functions and will therefore cause variations in the amplitude of a frequency modulated wave formed from the functions but will not cause variations in the frequency of the wave. Hence the effects of such variations may be eliminated by limiters.

When a device according to the invention produces a sine or cosine function, if the column of light is itself modulated by a wave of the carrier frequency, the output will comprise a wave of that carrier frequency modulated by the sine function or the cosine function of the modulating intelligence. Therefore, if two devices are used, one for the production of a sine function and the other for the production of a cosine function and the sources of illumination for the individual devices be modulated by phases of a wave of the carrier frequency that are in quadrature, the sum of the output from each device will be a wave whose frequency is that of the carrier wave and which is frequency modulated by the intelligence. Such a frequency modulated light wave can be converted into an electric wave by means of photo electric cells in accordance with well known practice.

When sine and cosine functions are produced by means of the invention, it is not necessary to convert them immediately into a frequency modulated wave. They can be stored or recorded by known means on phonograph discs, or films, or by other known processes.

If the means for the production of the sine and cosine functions are those described in this specification recordings may be made, for both sine and cosine functions, of either the output of the light from each mask, or of the difference between the outputs of two displaced masks. Furthermore, in order to reproduce such recordings of the sine and cosine functions in the form of the original modulating signal or intelligence, it is not necessary to go through the complete process of conversion to frequency modulated waves, followed by the process of demodulation as they may be applied to a device for converting sine and cosine functions into mechanical movement such as is described in copending U. S. Patent application No. 622,063, filed October 12, 1945.

The recording of sine and cosine functions in the manner above described has an advantage in that the sum of the amplitudes of both the recording tracks is approximately of constant amplitude and that this sum is not dependent upon the amplitude of the initial intelligence.

It will also be apparent that such sine and cosine functions may be transmitted for purposes of communication with the inherent advantage that an upper limit is set to the depth of amplitude modulation required.

Having now described my invention what I claim as new and desire to secure by Letters Patent is:

1. A device for generating an electrical quantity proportional to a trigonometric function of an angle proportional to an electrical magnitude, comprising means to generate a light column, means to modulate said light column to produce variations in a dimension of said column proportional to said electrical magnitude, a masking element having a configuration proportional to said trigonometric function and arranged in a first portion of said modulated light column to produce light energy varying in value as a trigonometric function of an angle proportional to said dimension of said column, means to convert light energy derived from said masking element into an electrical potential proportional to said light energy, a second masking element having a configuration proportional to said trigonometric function and arranged in a second portion of said modulated light column to produce light energy varying in value as a trigonometric function of the sum of a constant angle and an angle proportional to said dimension of said column, means to convert the light energy derived from said second masking element into a second electrical potential proportional to said light energy, and means to combine said first and said second electrical potentials to produce an electrical quantity varying as a trigonometric function of an angle proportional to said electrical magnitude.

2. A device for generating an electrical quantity proportional to a sinusoidal function of an angle proportional to an electrical magnitude, comprising means to produce a light column, means to modulate said light column to produce variations in the length of said column proportional to said electrical magnitude, a masking element having a configuration proportional to said sinusoidal function and arranged in a first portion of said modulated light column to produce light energy varying in value as a sinusoidal function of an angle proportional to the length of said column, means to convert light energy derived from said masking element into an electrical potential proportional to said light energy, a second masking element displaced with respect to said first masking element in the direction corresponding to said length of said column, having a configuration proportional to said sinusoidal function, and arranged in a second portion of said modulated light column to produce light energy varying in value as a sinusoidal function of the sum of a constant angle and an angle proportional to the length of said column, means to convert the light energy derived from said second masking element into a second electrical potential proportinal to said light energy, and means to combine said first and said second electrical potentials in opposition.

3. A device for generating an electrical quantity proportional to a sinusoidal function of an angle proportional to an electrical magnitude, comprising a columnar light source, means to apply an operating potential to said light source, means to modulate said light source to produce a column of light varying in length proportional to said electrical magnitude, an opaque masking element having a transparent aperture having a configuration proportional to said sinusoidal function and arranged in a portion of said modulated light column to produce light energy varying in value as a sinusoidal function of an angle proportional to the length of said column, a photoelectric cell positioned with respect to said aperture of said masking element to convert light energy derived from said masking element into an electrical potential proportional to said light energy, a second opaque masking element having a transparent aperture having a configuration proportional to said trigonometric function arranged in a second portion of said modulated light column and displaced relative to said first masking element to produce light energy varying in value as a sinusoidal function of the sum of a constant angle and an angle proportional to the length of said column, a photoelectric cell positioned with respect to said aperture of said second masking element to convert the light energy derived from said second masking element into a second electrical potential proportional to said light energy, and means to combine said first and said second electrical potentials in opposition.

4. A device for generating an electrical quantity proportional to a sinusoidal function of an angle proportional to an electrical magnitude, comprising a columnar light source, means to apply an operating potential to said light source, means to modulate said light source to produce a column of light varying in length proportional to said electrical magnitude, an opaque masking element having a transparent aperture having a sinusoidal configuration and arranged in a portion of said modulated light column to produce light energy varying in value as a sinusoidal function of an angle proportional to the length of said column, a photoelectric cell positioned with respect to the aperture of said masking element to convert light energy derived from said masking element into an electrical potential proportional to said light energy; a second columnar light source, means to apply an operating potential to said second light source, means to modulate said second light source in opposition to said first light source to produce a column of light varying proportional to said electrical magnitude, a second opaque masking element having a transparent aperture having a sinusoidal configuration and arranged in a portion of said second modulated light column to produce light energy varying in value as a sinusoidal function of the sum of a constant angle and an angle proportional to the length of said second column, a photoelectric cell positioned with respect to said aperture of said second masking element to convert the light energy derived from said second masking element into a second electrical potential proportional to said light energy, and means to combine said first and said second electrical potentials in opposition.

5. A device for generating an electrical quantity proportional to a sinusoidal function of an angle proportional to an electrical magnitude, comprising means to generate a column of light, both ends of which column vary simultaneously about the center of said column, means to modulate said light column to produce variations in the length of said column proportional to said electrical magnitude, an opaque masking element having an aperture having a sinusoidal configuration arranged in a path of the light from one end of said modulated light column to produce light energy varying in value as a sinusoidal function of an angle proportional to the length of said column; means to convert light derived from said aperture of said masking element into an electrical potential proportional to said light energy, a second opaque masking element having an aperture having a sinusoidal configuration and arranged in the path of the light from the other end of said modulated light column to produce light energy varying in value as a sinusoidal function of the sum of a constant angle and an angle proportional to the length of said column, means to convert the light energy derived from said aperture of said second masking element into a second electrical potential proportional to said light energy, and means to combine said first and said second electrical potentials in opposition.

6. A device for generating electrical quantities proportional to the sine and cosine functions of an angle proportional to an electrical magnitude, comprising means to generate a column of light, both ends of which column vary simultaneously about the center of said column, means to modulate said light column to produce variations in the length of said column proportional to said electrical magnitude, an opaque masking element having an aperture having a configuration proportional to said sine function and arranged in a portion of the light from one end of said modulated light column to produce light energy varying in value as a sine function of an angle proportional to the length of said column, means to convert light energy derived from said aperture of said masking element into an electrical potential proportional to said light energy, a second opaque masking element having an aperture having a configuration proportional to said sine function, arranged in a second portion of the light from the said end of said modulated light column onto said second masking element to produce light energy varying in value as a sine function of the sum of a constant angle and an angle proportional to the length of said column, means to convert the light energy derived from said aperture of said second masking element into a second electrical potential proportional to said light energy, means to combine said first and said second electrical potentials in opposition, a third opaque masking element having an aperture having a configuration proportional to said cosine function, means to impinge the light from the other end of said modulated light column onto said third masking element to produce light energy varying in value as a cosine function of an angle proportional to the length of said column, means to convert light energy derived from said aperture of said masking element into an electrical potential proportional to said light energy, a fourth opaque masking element having an aperture having a configuration proportional to said cosine function, means to impinge the light from said other end of said modulated light column onto said fourth masking element to produce light energy varying in value as a cosine function of the sum of a constant angle and an angle proportional to the length of said column, means to convert the light energy derived from said aperture of said fourth masking element into a fourth electrical potential proportional to said light energy, and means to combine said third and said fourth electrical potentials in opposition.

E. G. BEARD.

REFERENCES CITED

The following references are of record in the file of this patent:

UNITED STATES PATENTS

| Number | Name | Date |
|---|---|---|
| 1,844,146 | Chromy | Feb. 9, 1932 |
| 2,274,686 | Gray | Mar. 3, 1942 |
| 2,294,209 | Roder | Aug. 25, 1942 |
| 2,337,272 | Roberts | Dec. 21, 1943 |